Dec. 14, 1965  A. H. BAHNSON, JR  3,223,038
ELECTRICAL THRUST PRODUCING DEVICE
Filed Sept. 10, 1964
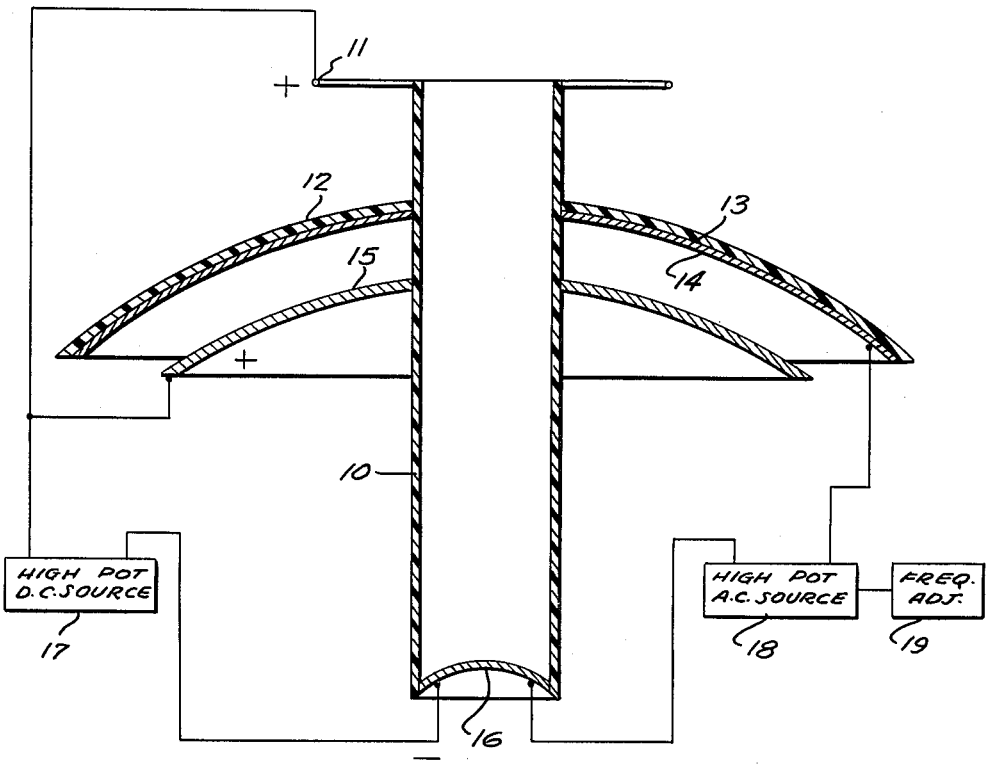
INVENTOR
AGNEW H. BAHNSON, JR., DECEASED
by- WACHOVIA BANK & TRUST CO.,
EXECUTOR
BY
Mason, Fenwick & Lawrence
ATTORNEYS

United States Patent Office 3,223,038
Patented Dec. 14, 1965

3,223,038
ELECTRICAL THRUST PRODUCING DEVICE
Agnew H. Bahnson, Jr., deceased, late of Winston-Salem, N.C., by Wachovia Bank and Trust Company, executor, P.O. Box 3099, Winston-Salem, N.C.
Filed Sept. 10, 1964, Ser. No. 395,621
6 Claims. (Cl. 103—1)

This invention relates to apparatus for utilizing electrical energy to produce forces, hereinafter frequently termed thrust or relative thrust, for causing relative motion between the apparatus and the surrounding medium.

This application is a continuation-in-part of copending application Serial No. 109,634, filed May 12, 1961, now abandoned, by Agnew H. Bahnson, Jr., which was in turn a continuation-in-part of application Serial No. 745,652 filed June 30, 1958, now abandoned.

The apparatus broadly comprises an arrangement of spaced electrodes supported upon a carrier body of electrical insulating material. The electrodes have such a configuration as to establish a non-uniform electrical field when a difference in potential is applied to the electrodes and the nonuniform field is believed to accelerate ions produced in the region of the charged electrodes, thus resulting in a relative thrust to cause relative movement between the supporting body and the surrounding gaseous medium in which it is placed.

An electrical thrust producing device of this general character is disclosed in United States Letters Patent No. 2,958,790 granted Nov. 1, 1960. In the aforesaid patent, the electrodes are charged from a source of unidirectional potential only. The present invention utilizes the discovery that if the unidirectional potential is applied to certain electrodes of the electrode assembly and an alternating potential is applied to other electrodes in the assembly, an augmented thrust effect results. While there is uncertainty as to the actual theory involved in this phenomena, repeated experiments have confirmed the fact that an augmented thrust does result, and it is theorized that the use of the alternating potential results in the production of more ions to be accelerated in the nonuniform field created by the application of the unidirectional potential to certain of the electrodes.

It has also been observed in experiments that the frequency of the alternating potential has some effect upon the degree and efficiency of ionization of the gaseous medium in which the apparatus operates, and it is further believed that an optimum condition results when the frequency is in resonance with the internal amplitude of the molecules of the air or other gaseous medium in which the apparatus operates.

Consequently it is an object of the present invention to provide novel electrical thrust producing apparatus of the general type described wherein both unidirectional and alternating potentials are applied respectively to different electrodes in the electrode assembly so as to provide an optimum relative thrust effect for producing relative motion between the apparatus and the surrounding medium.

It is a further object of the invention to provide for adjusting the frequency of the alternating potential to establish a resonance condition with the surrounding medium.

It is a further and more specific object of the invention to provide novel electrical thrust producing apparatus comprising a pair of arcuate electrodes spaced from each other and from a third electrode, the electrodes being mounted in spaced relation upon a carrier body of electrical insulating material. A unidirectional potential is applied between one of the arcuate electrodes and the third electrode, and an alternating potential is applied between the other arcuate electrode and the third electrode thereby to produce a relative thrust for effecting relative motion between the carrier body and the surrounding medium in the direction of the apex of the arcuate electrode.

Another specific object of the invention is to provide novel electrical thrust producing apparatus comprising a supporting body of insulating material having a plurality of electrodes mounted thereon in spaced relation from each other. One electrode is mounted at one end of the body, another electrode in the form of an electrically conductive ring is mounted at the opposite end of the body, and two other arcuate electrodes are mounted on the body between the endmost electrodes. A unidirectional potential is applied between the ring electrode and the electrode at the opposite end of the body and is likewise applied between the latter electrode and one of the arcuate electrodes. An alternating potential is applied between the other arcuate electrode and said latter electrode.

The foregoing as well as other objects and advantages inherent in the invention will become more apparent from the following detailed description of one representative embodiment thereof and the accompanying drawing which is a combined structural and electrical schematic view.

With reference now to the drawing, the supporting or carrier body for the electrode assembly is indicated at 10 and is seen to be in the form of an elongated hollow cylinder made from a suitable dielectric material which is, of course, relatively nonconductive in an electrical sense. Mounted at one end of the body 10 is an electrode 11 in the form of a ring which can be made from electrically conductive wire supported in a suitable manner concentric with the longitudinal axis of the cylindrical body 10. Mounted upon the body 10 in spaced relation from the ring electrode 11 is an arcuately shaped electrode 12 which can be constituted by an arcuately shaped member 13 of dielectric material having an electrically conductive metallic surface 14 applied to its inner or concave surface, or this metallic surface may be embedded in a dielectric material and may be in the form of a screen having a fine mesh to define the electrode.

Also mounted upon the cylindrical body 10 in spaced relation from the arcuate electrode 12 is a second arcuately configured electrode 15. This electrode may be metallic throughout or may be made in the same manner as electrode 12. Electrode 15 is curved in the same direction as electrode 12 and both of these electrodes are centered, i.e. they are symmetrical with respect to the longitudinal axis of the cylindrical body 10. At the opposite end of the body 10 is still another arcuately shaped electrode 16.

In accordance with the invention, a unidirectional potential is applied between certain of the electrodes and an alternating potential is applied between other electrodes to obtain an optimum thrust effect upon the body in the direction of the axis thereof. In the embodiment of the invention which has been illustrated, a unidirectional potential shown schematically as a D.C. source 17 has the negative terminal connected by conductor means to the lower endmost arcuate electrode 16 and the positive terminal connected by conductor means to the ring electrode 11 and also to the arcuate electrode 15. A source of A.C., i.e. alternating potential 18, also shown schematically, is connected by suitable conductor means between the endmost electrode 16 and the other arcuate electrode 12. Electrode 15 is disposed between the arcuate electrode 12 and the lower, endmost electrode 16, and it is believed that the alternating field which is produced serves to produce more ions to be accelerated in the nonuniform electrical field established between the other electrodes by application thereto of the unidirectional potential, thus augmenting considerably the relative thrust effect which could heretofore be obtained by use of only a unidirectional potential.

Since the frequency of the applied alternating potential has some effect upon the degree and efficiency of the ionization in the gaseous medium in which the device operates, it will be seen that I have provided for adjusting the frequency of the alternating potential which is generated. This may be accomplished by various and well known devices and hence the frequency control has been indicated schematically only at 19, and optimum conditions are believed to prevail when the frequency corresponds to resonance of the internal amplitude of the molecules of the air or other gaseous medium in which the device operates.

It is not necessary that the "mixed" unidirectional and alternating potentials be applied to the electrodes in the specific manner above described. Substantially the same augmented thrust effect may be obtained by applying the alternating potential between electrodes 11 and 16 and between electrodes 15 and 16, and by applying the unidirectional potential between electrodes 12 and 16.

The amount of the relative thrust to be obtained will depend upon various design factors such as the magnitude of the potentials applied and will in general increase as the magnitude of the potentials increases. For a given dimensional relationship between the various electrodes and using a magnitude of 50 kilovolts for both the unidirectional and alternating potentials, a thrust force of 6 grams, measured along the axis of the cylindrical body 10 was produced. With a magnitude of 100 kilovolts, the thrust increased to 40 grams; for a magnitude of 125 kilovolts, the thrust increased to 60 grams; and for a magnitude of 150 kilovolts, the thrust increased to 100 grams.

One particular application of the foregoing device is as an electrical pumping or fluid circulating device for gaseous or liquid fluids capable of yielding ions responsive to the charges on the electrodes to provide unidirectional flow through a fluid circulating system. In such an application, the apparatus is supported at a fixed station in the fluid circulating system, as an air flow duct in an air circulating system, and the application of the D.C. and A.C. potentials to the electrodes in the manner previously described produces ions in the region of the electrodes and establishes field conditions which accelerate the ions toward the posterior electrode 16, the ions undergoing collision processes in the gaseous medium between electrodes (both charge exchange collisions and elastic collisions) and producing a predominantly unidirectional gaseous flow through the system.

In conclusion, it is desired to point out that while only one embodiment of the present invention has been described and illustrated, the specific details thereof may be departed from without, however, departing from the spirit and scope of the invention as defined in the appended claims.

What is claimed is:

1. Apparatus for producing relative motion between the apparatus and surrounding ambient atmospheric fluid medium in open communication with the ambient environment in which the apparatus is located comprising a carrier member of electrical insulation material extending along a longtitudinal axis, a plurality of electrodes exposed to surrounding ambient atmosphere mounted on said carrier member at spaced positions along said axis to produce electrically charged ions in said medium and effect predominantely uindirectional flow thereof along said axis, means applying a unidirectional electrical potential between certain of said electrodes to produce said ions and accelerate the same predominantly unidirectionally along said axis and means applying an alternating electrical potential between others of said electrodes augmenting production of said ions and thrust effects arising from relative motion thereof along said axis.

2. Apparatus as defined in claim 1 wherein the frequency of said alternating electrical potential may be adjusted.

3. Apparatus for producing relative motion between the apparatus and surrounding ambient atmospheric fluid medium in open communication with the ambient environment in which the apparatus is located comprising a carrier member of electrical insulating material extending along a longitudinal axis, a plurality of electrodes spaced along said axis including a first electrode mounted at one end of said carrier member, and second and third electrodes mounted on said carrier member at spaced positions along said axis from said first electrode, said electrodes being exposed to surrounding ambient atmosphere and coacting upon application of electrical potential thereto to produce electrically charged ions and establish field conditions effecting predominantly unidirectional flow of the ions and surrounding fluid medium parallel to said axis through collision between said ions and neutral particles in said medium, means applying a unidirectional electrical potential between said first electrode and one of said second and third electrodes, and means applying an alternating electrical potential between said first electrode and the other of said second and third electrodes augmenting production of said ions and thrust effects arising from relative motion induced in said ions and neutral particles.

4. An electrical thrust producing device as defined in claim 3 wherein the frequency of said alternating electrical potential is adjustable.

5. Apparatus for producing relative motion between the apparatus and a fluid medium surrounding the same comprising first, second, third and fourth electrodes spaced serially fixed distances apart along a selected direction of relative motion, said first electrode being in the configuration of a ring, said second and third electrodes being of spherical arcuate configuration having convex surfaces facing said first electrode of expanded surface with respect to said first electrode, said electrodes being capable of producing electrically charged ions in the region thereof and accelerating the same predominantly unidirectionally to produce flow of the surrounding fluid medium in said selected direction upon application of electrical potential to said electrodes, means for applying a direct current electrical potential between said first electrode and said fourth electrode and between said third electrode and said fourth electrode, and means for applying an alternating current electrical potential between said second electrode and said fourth electrode.

6. Apparatus for producing relative motion between the apparatus and a fluid medium surrounding the same comprising an elongated hollow cylindrical support of dielectric material, a first electrode of ring shaped configuration having a greater diameter than said support at one end thereof, second and third electrodes of spherical arcuate configuration spaced at successive locations along said support, spaced from said first electrode toward the other end of said support having expanded surfaces with respect to said first elctrode and having convex surfaces facing said first electrode, and a fourth electrode of sperical arcuate configuration having a diameter substantially corresponding to the diameter of said support supported at the other end of said support, said electrodes being capable of producing electrically charged ions in the region thereof and accelerating the same predominantly unidirectionally to produce flow of the surrounding fluid medium in said selected direction upon application of electrical potential to said electrodes, means for applying a direct current electrical potential between said first electrode and said fourth electrode and between said third electrode and said fourth electrode, and means for applying an alternating current electrical potential between said second electrode and said fourth electrode.

References Cited by the Examiner

UNITED STATES PATENTS

| | | | |
|---|---|---|---|
| 2,022,465 | 11/1935 | Hansell | 230—69 |
| 2,131,897 | 10/1938 | Malter | 230—69 |
| 2,570,158 | 10/1951 | Schissel | 103—1 |
| 2,778,945 | 1/1957 | Burk | 103—1 |
| 2,952,970 | 9/1960 | Blackman. | |

LAURENCE V. EFNER, *Primary Examiner.*